US012102851B2

(12) United States Patent
Strauss et al.

(10) Patent No.: US 12,102,851 B2
(45) Date of Patent: Oct. 1, 2024

(54) FALL PROTECTION SYSTEM

(71) Applicant: 3M INNOVATIVE PROPERTIES COMPANY, St. Paul, MN (US)

(72) Inventors: Andrew C. Strauss, Goodhue, MN (US); Nicholas G. Bauer, Lake City, MN (US); Michael T. Weiss, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 17/754,957

(22) PCT Filed: Nov. 6, 2020

(86) PCT No.: PCT/IB2020/060467
§ 371 (c)(1),
(2) Date: Apr. 18, 2022

(87) PCT Pub. No.: WO2021/099874
PCT Pub. Date: May 27, 2021

(65) Prior Publication Data

US 2022/0379147 A1 Dec. 1, 2022

Related U.S. Application Data

(60) Provisional application No. 62/938,481, filed on Nov. 21, 2019.

(51) Int. Cl.
*A62B 35/00* (2006.01)
*B66C 23/24* (2006.01)
(Continued)

(52) U.S. Cl.
CPC .......... *A62B 35/0068* (2013.01); *B66C 23/24* (2013.01); *B66C 23/44* (2013.01);
(Continued)

(58) Field of Classification Search
CPC . A62B 35/0068; E04G 21/3238; B66C 23/24; B66C 23/44; B66C 23/80; B66C 23/705
See application file for complete search history.

(56) References Cited

U.S. PATENT DOCUMENTS 1,520,768 A * 12/1924 Owen ........................ B60R 9/02 294/74
4,008,669 A * 2/1977 Sumrell .................... B60P 7/12 105/422
(Continued)

FOREIGN PATENT DOCUMENTS

CA 2644824 A1 5/2010
CN 207313800 U 5/2018
(Continued)

OTHER PUBLICATIONS

European Application 20890005 Supplementary Search Report dated Oct. 11, 2023, 2 pages.
(Continued)

*Primary Examiner* — Eret C McNichols
(74) *Attorney, Agent, or Firm* — Kenneth B. Wood

(57) ABSTRACT

A fall protection system includes a base plate defining a first side and a second side defined opposite to the first side. The fall protection system also includes a mast assembly connected to the base plate proximate to the first side of the base plate. The fall protection system further includes a jib inclined with respect to the mast assembly and pivotably connected to the mast assembly. The fall protection system includes a counterweight connectable to the base plate proximate to the second side of the base plate.

20 Claims, 6 Drawing Sheets

(51) Int. Cl.

| | |
|---|---|
| *B66C 23/44* | (2006.01) |
| *B66C 23/70* | (2006.01) |
| *B66C 23/80* | (2006.01) |
| *E04G 21/32* | (2006.01) |

(52) U.S. Cl.
CPC ............ *B66C 23/705* (2013.01); *B66C 23/80* (2013.01); *E04G 21/3238* (2013.01)

(56) References Cited

U.S. PATENT DOCUMENTS 4,015,686 A 4/1977 Bushnell, Jr.
4,096,952 A 6/1978 Diggs
4,171,032 A * 10/1979 Woolslayer ......... E04G 21/3276 248/228.2
4,487,537 A * 12/1984 Morse ....................... B60P 7/12 410/100
4,511,015 A * 4/1985 Purdy ................... B66F 11/046 182/2.11
4,607,724 A * 8/1986 Hillberg ................ E04G 21/329 182/36
4,607,990 A * 8/1986 Eggers ...................... G21F 9/36 410/94
4,619,346 A 10/1986 Deguerry
4,660,730 A * 4/1987 Holmes ................. B66F 11/044 74/625
4,705,140 A * 11/1987 Dudley .................... A62B 1/02 182/113
4,724,924 A * 2/1988 Breyer .................. B66F 11/044 74/491
4,725,033 A * 2/1988 Zinnecker ............... B63B 25/28 248/172
4,852,692 A * 8/1989 Flaherty ................ E04G 21/329 248/539
4,942,943 A * 7/1990 Flaherty ................. A62B 35/04 248/539
5,021,917 A * 6/1991 Pike ...................... B66F 11/046 182/2.11
5,107,955 A * 4/1992 Kishi .................... B66F 11/046 182/2.1
5,113,969 A * 5/1992 Drolet ....................... E21D 9/12 182/2.11
5,143,010 A * 9/1992 Behr ....................... B63B 25/28 410/96
5,307,898 A * 5/1994 Purdy ................... B66F 11/046 52/118
5,645,180 A * 7/1997 Zaguroli, Jr. ........... B66C 23/16 212/253
5,996,722 A * 12/1999 Price .................. B60G 17/0152 180/234
6,082,561 A 7/2000 Bembas
6,095,349 A * 8/2000 O'Meara ................... B60R 9/06 212/293
6,138,991 A * 10/2000 Myers, Jr. ............... B66C 23/44 212/180
6,250,483 B1 * 6/2001 Frommer ................. A22B 5/06 452/189
6,378,652 B1 * 4/2002 Albert ................... B66F 11/046 182/148
6,467,576 B2 * 10/2002 Figura ..................... E06C 7/186 182/2.5
6,821,075 B2 * 11/2004 van der Horn ......... B66C 23/44 414/543
6,830,423 B1 * 12/2004 Williams ............. A61G 3/0209 212/180
6,951,345 B2 * 10/2005 Wilks ....................... B60D 1/38 254/326
6,981,834 B1 * 1/2006 Henry ................... B60P 1/5471 212/299
7,032,710 B2 4/2006 Anderson et al.
7,543,671 B2 * 6/2009 Donaldson ............ B66F 11/044 180/209
7,828,116 B2 * 11/2010 Vetesnik ................... E06C 7/18 182/115
7,845,622 B1 * 12/2010 Riggs ...................... B66C 23/44 254/326
7,926,787 B2 * 4/2011 Wieland .................... B66F 3/35 254/93 HP
8,505,684 B1 * 8/2013 Bogue ................... B66F 11/042 182/69.5
8,925,679 B2 * 1/2015 Vetesnik ............ A62B 35/0006 188/376
9,410,332 B2 * 8/2016 Patton ..................... E04G 5/001
9,623,270 B2 * 4/2017 Palet .................. A62B 35/0068
9,630,816 B1 * 4/2017 Napieralski ............. B66C 19/02
9,744,386 B2 * 8/2017 Baughman ......... A62B 35/0068
10,123,527 B1 * 11/2018 Leger, Sr. ................ B66D 3/26
10,125,503 B2 * 11/2018 Misiolek ................... E04G 5/00
10,174,878 B2 * 1/2019 Kaytes .................. B66C 13/005
10,347,109 B2 * 7/2019 Troy .................. G08B 21/0446
10,456,608 B2 * 10/2019 Johanneck ......... A62B 35/0068
10,463,895 B2 * 11/2019 Palet .................. F16M 11/2021
11,459,780 B2 * 10/2022 Martin Iglesias ..... E04G 21/329
11,465,888 B2 * 10/2022 Laidler ................... B66C 23/44
11,603,675 B2 * 3/2023 Nichols ............. A62B 35/0068
11,638,843 B2 * 5/2023 Jones ................ A62B 35/0093 182/231
11,795,712 B2 * 10/2023 Head ................... E04G 21/3214
11,801,405 B2 * 10/2023 Sargent ............... E04G 21/3276
2002/0121577 A1 * 9/2002 Metelski ................ F16M 11/42 901/41
2003/0173149 A1 9/2003 Anderson et al.
2004/0195041 A1 * 10/2004 Vetesnik ............. E04G 21/3276 182/3
2005/0034920 A1 * 2/2005 Anderson .......... A62B 35/0068 182/3
2005/0169735 A1 * 8/2005 Pelsue ................ A62B 35/0068 414/469
2006/0208240 A1 * 9/2006 Spittle ..................... B66C 23/48 254/8 B
2008/0002967 A1 * 1/2008 Chapman ............. G03B 17/561 396/428
2009/0145871 A1 * 6/2009 Bond .................... B66F 11/046 212/285
2010/0126801 A1 5/2010 Begin et al.
2010/0200822 A1 * 8/2010 Kitchens, Sr. ........ B66C 23/701 254/326
2011/0033293 A1 * 2/2011 Cavalieri .................. F03D 7/02 416/9
2012/0138386 A1 * 6/2012 Robitaille .......... A62B 35/0068 182/12
2013/0240683 A1 * 9/2013 Fusy ........................ B67D 9/02 248/70
2013/0284688 A1 * 10/2013 Narcisco ................. B66C 23/26 212/175
2013/0313396 A1 * 11/2013 Vetesnik .................... F41J 1/10 248/523
2014/0076659 A1 * 3/2014 Terry .................. E04G 21/3238 182/112
2015/0375020 A1 * 12/2015 Palet .................. A62B 35/0068 248/122.1
2016/0271430 A1 * 9/2016 Baughman ............. F16M 11/42
2016/0376806 A1 * 12/2016 Vetesnik ............ A62B 35/0068 52/121
2017/0225017 A1 * 8/2017 Johanneck ......... A62B 35/0068
2017/0225018 A1 * 8/2017 Palet ...................... F16M 11/38
2017/0247236 A1 * 8/2017 Svoboda .................. B66D 1/36
2017/0370114 A1 12/2017 Kornijenko et al.
2018/0126198 A1 * 5/2018 Troy ..................... B66F 11/044
2018/0142834 A1 * 5/2018 Cuttill ...................... G09F 17/00
2020/0016440 A1 * 1/2020 Palet .................. A62B 35/0068
2022/0119230 A1 * 4/2022 Laidler ................... B66C 23/44
2022/0119231 A1 * 4/2022 Laidler ................... B66C 23/44
2022/0203146 A1 * 6/2022 Palet .................. A62B 35/0068
2022/0362593 A1 * 11/2022 Strauss .............. A62B 35/0068
2022/0379147 A1 * 12/2022 Strauss .............. A62B 35/0068
2022/0379148 A1 * 12/2022 Strauss .............. A62B 35/0068

(56) References Cited

U.S. PATENT DOCUMENTS

| | | | | |
|---|---|---|---|---|
| 2023/0127292 | A1* | 4/2023 | Palet | B66F 17/006<br>248/558 |

FOREIGN PATENT DOCUMENTS

| | | | | |
|---|---|---|---|---|
| EP | 0517997 | B1 | 12/1994 | |
| EP | 2999523 | B1 | 4/2017 | |
| FR | 2968325 | B1 | 8/2013 | |
| NL | 2024387 | B1 * | 8/2021 | A62B 35/0068 |
| WO | 2003018459 | A1 | 3/2003 | |
| WO | 2014189512 | A1 | 11/2014 | |
| WO | 2021099875 | A1 | 5/2021 | |
| WO | 2021099876 | A1 | 5/2021 | |

OTHER PUBLICATIONS

International Search Report for PCT Application No. PCT/IB2020/060467 mailed on Feb. 2, 2021, 3 pages.

International Search Report for PCT Application No. PCT/IB2020/060468 mailed on Feb. 2, 2021, 3 pages.

International Search Report for PCT Application No. PCT/IB2020/060469 mailed on Feb. 16, 2021, 3 pages.

* cited by examiner

FALL PROTECTION SYSTEM

TECHNICAL FIELD

The present disclosure relates to a fall protection system.

BACKGROUND

As per regulations applied on construction, industrial, maintenance, and allied industries, it is essential to employ a system that protects personnel from falling when personnel perform operations at elevated locations. In order to comply with such regulations, industries take various measures to ensure protection of personnel operating at the worksites. Typically, a fall protection system is used at the worksite when personnel perform work operations at the elevated locations. The fall protection system is transportable from one place to another by a conveying apparatus, such as a forklift, as per requirements. Further, the fall protection system typically includes a base assembly, a mast assembly, and a jib portion. A personnel is tethered to the jib portion using one or more cables in order to ensure fall protection. It is desirable that the fall protection system is lightweight, easy to install and transport, and provides improved reliability in operation.

SUMMARY

Generally, the present invention relates to a fall protection system and a method to assemble such the fall protection system.

Some embodiments of the present disclosure relate to a fall protection system. The fall protection system includes a base plate defining a first side and a second side defined opposite to the first side. The fall protection system also includes a mast assembly connected to the base plate proximate to the first side of the base plate. The fall protection system further includes a jib inclined with respect to the mast assembly and pivotably connected to the mast assembly. The fall protection system includes a counterweight connectable to the base plate proximate to the second side of the base plate.

In some embodiments, a center of gravity of the counterweight is offset from a center of the base plate.

In some embodiments, the base plate further defines a slot at the second side. The slot at least partially receives the counterweight therein.

In some embodiments, the counterweight is generally rectangular in shape.

In some embodiments, the fall protection system further includes a plurality of fastening elements for removably connecting the counterweight to the base plate.

In some embodiments, the plurality of fastening elements includes at least one of a plurality of cables and a plurality of turnbuckles.

In some embodiments, a material of the counterweight includes at least one of metal and concrete.

In some embodiments, the base plate of the fall protection system is receivable by a conveying apparatus.

Some embodiments of the present disclosure relate to a fall protection system. The fall protection system includes a base plate defining a first side and a second side defined opposite to the first side. The fall protection system also includes a mast assembly connected to the base plate proximate to the first side of the base plate. The fall protection system further includes a jib inclined with respect to the mast assembly and pivotably connected to the mast assembly. The fall protection system includes a counterweight connectable to the base plate proximate to the second side of the base plate. Further, a center of gravity of the counterweight is offset from a center of the base plate.

Some embodiments of the present disclosure relate to a method of assembling a fall protection system. The fall protection system includes a base plate defining a first side and a second side defined opposite to the first side. The method includes connecting a mast assembly to the base plate proximate to the first side of the base plate. The method also includes aligning a counterweight with the second side of the base plate. The method further includes receiving the counterweight proximate to the second side of the base plate. The method includes connecting, removably, the counterweight to the base plate proximate to the second side of the base plate by a plurality of fastening elements.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a fall protection system having a base assembly, a height adjustable mast assembly, a jib connected to a portion of the mast assembly, and a counterweight. The height adjustable mast assembly includes a fixed mast section and a movable mast section that may be moved relative to the fixed mast section. As per requirements, the movable mast section may be locked with the fixed mast section. Further, the mast assembly can be locked with the base assembly. The fall protection system may be used to arrest or prevent falling of a personnel operating at any worksite or industry.

The term “aligned” as used herein refers to angular alignment between a first component and a second component. In case the first component is a projection or a tab, and the second component defines a complementary opening, groove, or slot, the first component can be at least partially received within the second component when the first and second components are aligned with each other. In cases the first and second components are misaligned with each other, the first component cannot be received in the second component. In some cases, the first and second components can be axially spaced apart from each other when they are aligned.

Figure 1:
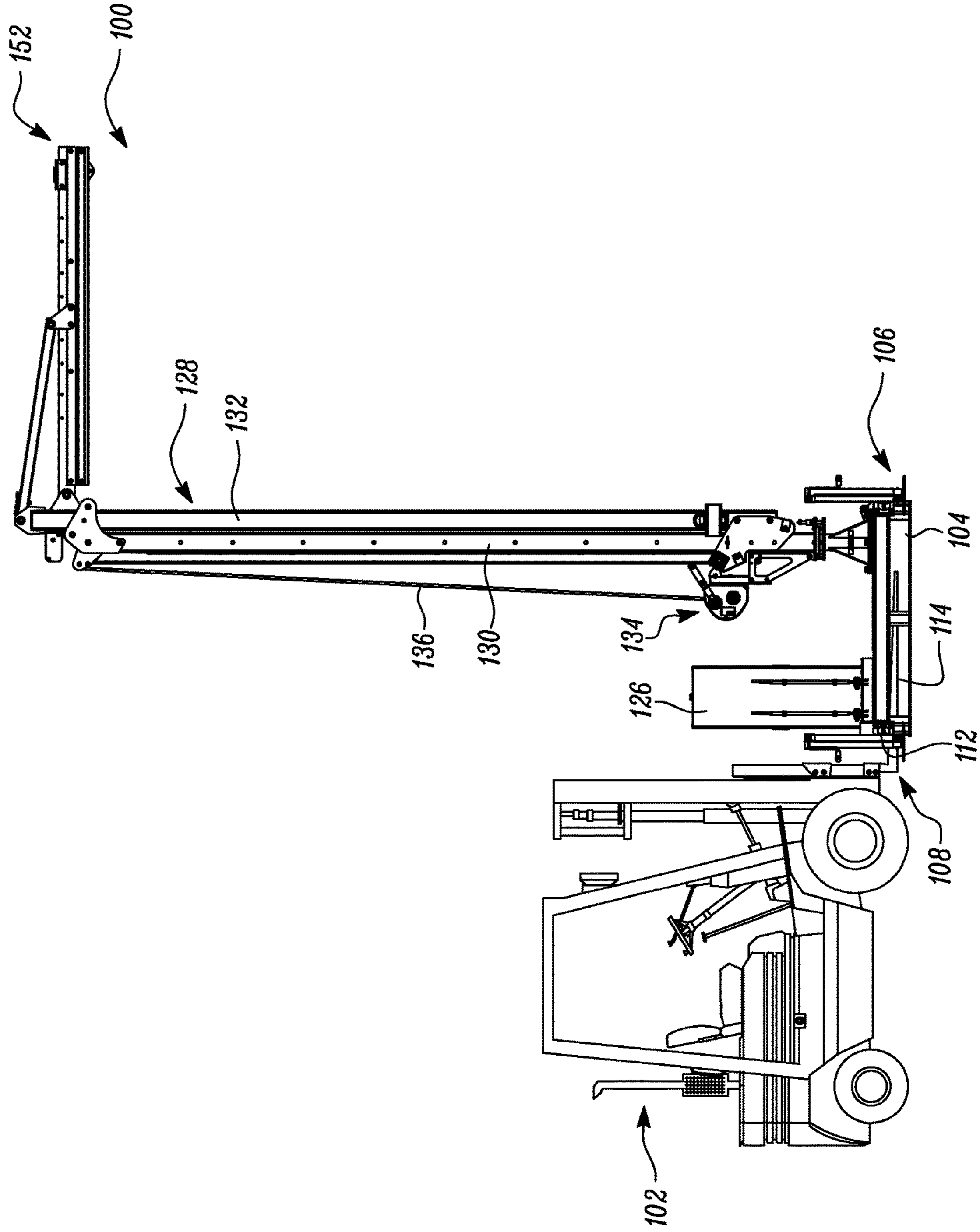
FIG. 1 is a side view of a fall protection system received by a conveying apparatus for transportation according to an embodiment of the present disclosure.

FIG. 1 illustrates an exemplary fall protection system 100. The fall protection system 100 may be used in industries, such as, construction, industrial, maintenance, and the like. The fall protection system 100 is transportable from one location to another as per application requirements. For this purpose, the fall protection system 100 is receivable by a conveying apparatus 102. The conveying apparatus 102 may include a forklift, a hand truck, or any other conveying apparatus that may be used to facilitate transportation of the fall protection system 100 from one location to another.

The fall protection system 100 includes a base plate 104 defining a first side 106 and a second side 108 defined opposite to the first side 106. Further, a first surface 110 (shown in FIG. 2) is defined at the first side 106 and a second surface 112 is defined at the second side 108. The base plate 104 is generally rectangular in shape. Alternatively, the base plate 104 may be square in shape. Further, the base plate 104 of the fall protection system 100 is receivable by the conveying apparatus 102. In an example, the base plate 104 may include one or more ports (not shown) to receive arms 114 of the conveying apparatus 102.

Figure 2:
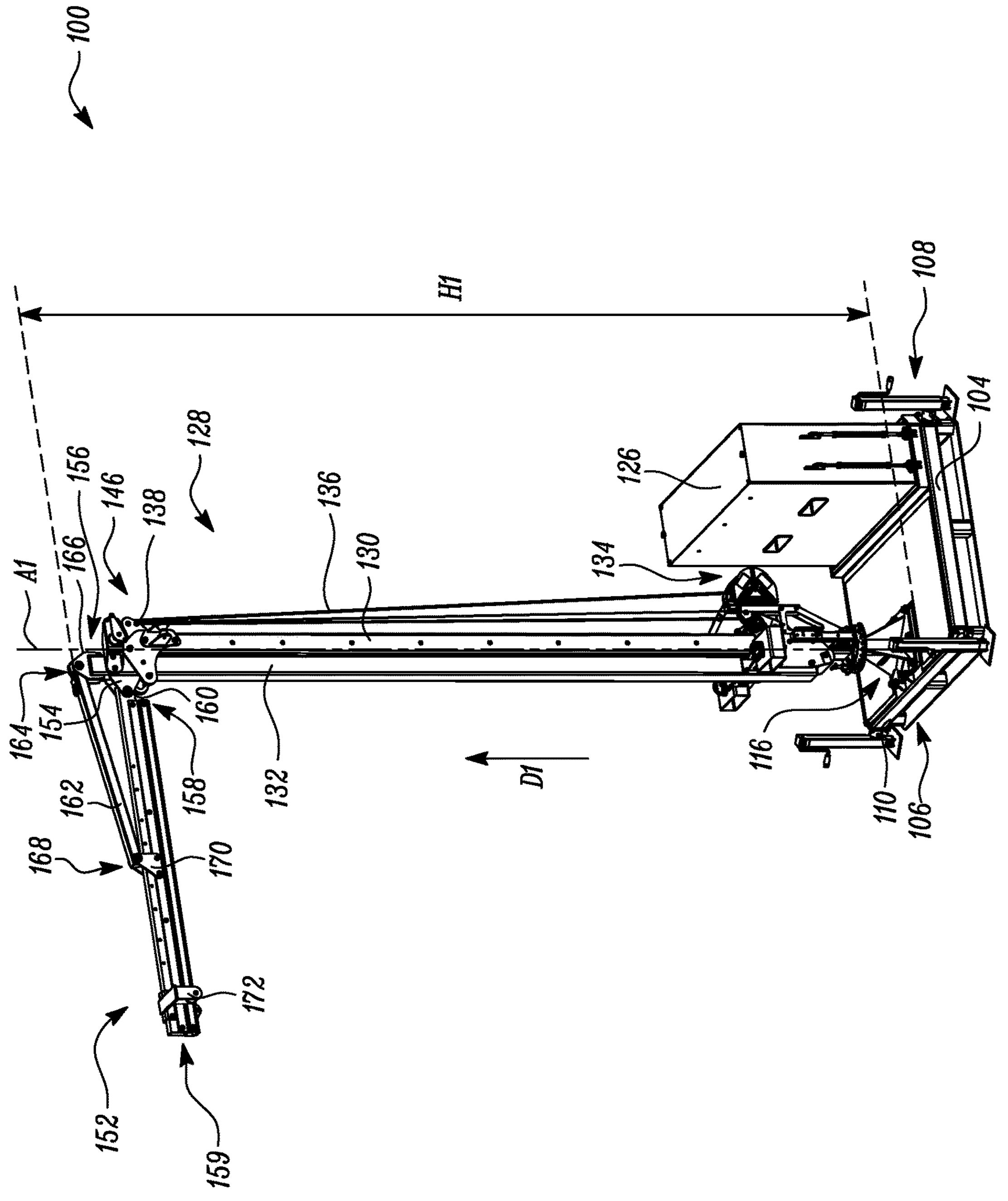
FIG. 2 is a perspective view of the fall protection system shown in FIG. 1.

As shown in FIG. 2, a base assembly 116 is connected to the base plate 104. It should be noted that the base assembly 116 is pivotably connected to base plate 10, such that the base assembly, a mast assembly 128, and a jib 152 of the fall protection system 100 can be pivoted relative to the base plate 104, as per requirements. As such, the base assembly 116 is pivotable about pivot points 118 (shown in FIG. 3). Further, the base assembly 116 is coupled proximate to the first side 106 of the base plate 104 using a number of mechanical fasteners 120 (shown in FIG. 3). More particularly, a plate 122 (shown in FIG. 3) of the base assembly 116 is removably coupled to the base plate 104. The mechanical fasteners 120 may include bolts, screws, and the like. The mechanical fasteners 120 may be removed in order to facilitate pivoting of the base assembly 116 during tip-up installations or transportation. Further, a counterweight 126 is connected to the base plate 104.

The fall protection system 100 includes the mast assembly 128 connected to the base plate 104 disposed proximate to the first side 106 of the base plate 104. More particularly, the mast assembly 128 is connected to the base plate 104 by the base assembly 116. The mast assembly 128 is rotatable about a first axis “A1” defined by the mast assembly 128. The mast assembly 128 includes a fixed mast section 130 and a movable mast section 132. The movable mast section 132 is adapted to move relative to the fixed mast section 130 for adjusting a height “H1” of the mast assembly 128. Accordingly, the movable mast section 132 may be moved relative to the fixed mast section 130 so that the height “H1” of the mast assembly 128 may be varied, as per application requirements. The movable mast section 132 may move along a first direction “D1” to increase the height “H1” of the mast assembly 128 and move in a direction that is opposite to the first direction “D1” to decrease the height “H1” of the mast assembly 128. In other words, the movable mast section 132 is extendable and retractable with respect to the base plate 104. Further, in a stowed position of the fall protection system 100, the movable mast section 132 may be in a fully retracted position. When the fall protection system 100 is in use, the movable mast section 132 may extend with respect to the base plate 104 based on relative movement between the movable mast section 132 and the fixed mast section 130. The fixed and movable mast sections 130, 132 may include hollow square-shaped tubes, without any limitations.

Figure 3:
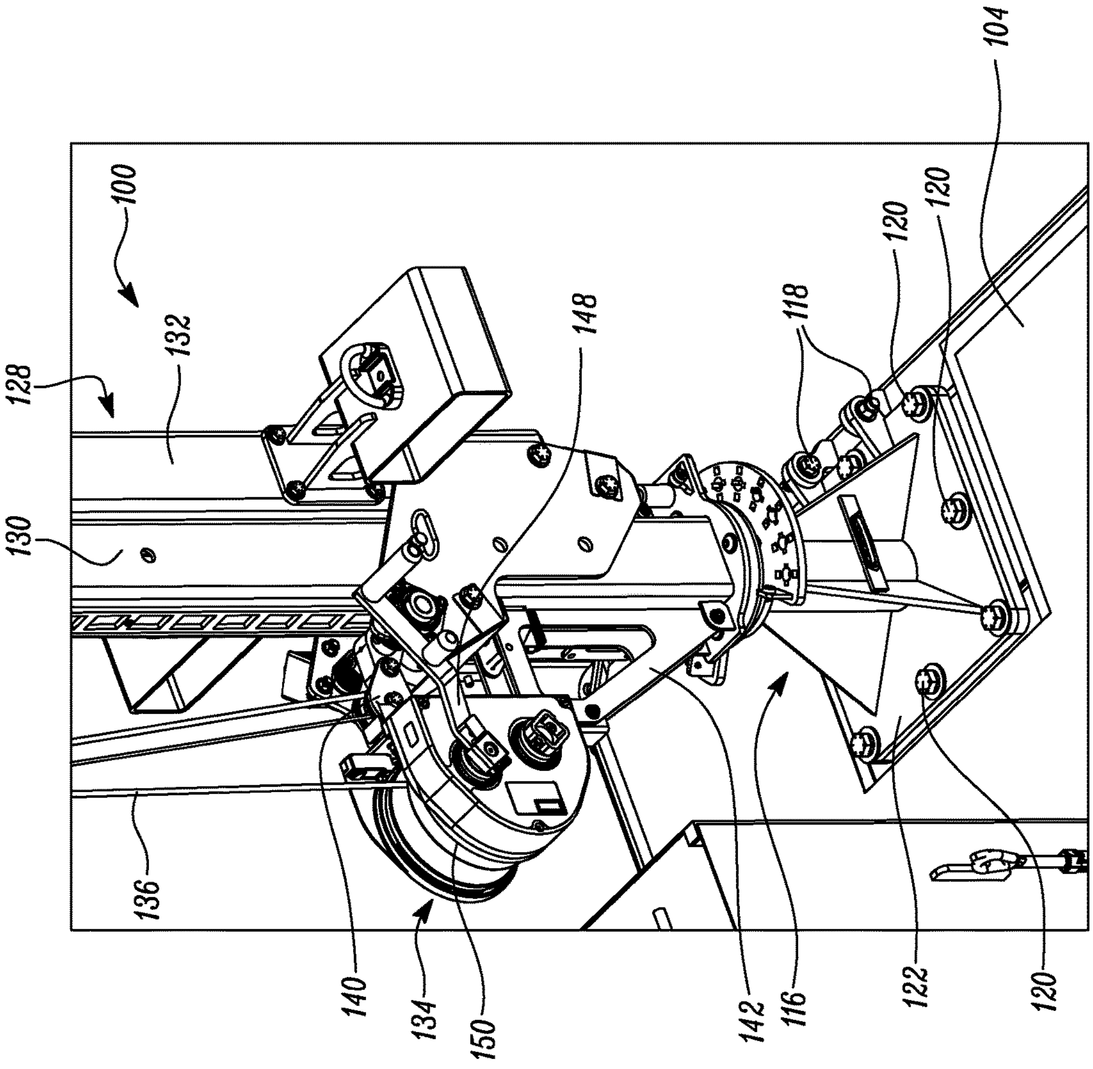
FIG. 3 is a perspective view illustrating a primary mechanism associated with the fall protection system shown in FIG. 1.

Referring to FIG. 3, a primary mechanism 134 is associated with the fall protection system 100. In an example, the primary mechanism 134 is embodied as a winch assembly. The primary mechanism 134 may be hereinafter interchangeably referred to as the winch assembly 134. The winch assembly 134 is operably connected to the movable mast section 132. More particularly, the winch assembly 134 is operably connected to the movable mast section 132 to move the movable mast section 132 relative to the fixed mast section 130. Further, the winch assembly 134 is connected to the fixed mast section 130 via a bracket 142. The movable mast section 132 is movable based on an operation of the winch assembly 134. The winch assembly 134 includes a cable 136. The winch assembly 134 is adapted to at least one of move the movable mast section 132 relative to the fixed mast section 130 and lock the movable mast section 132 relative to the fixed mast section 130. The winch assembly 134 selectively applies a first tension “T1” on the movable mast section 132 to move the movable mast section 132 relative to the fixed mast section 130 in order to raise the height “H1” of the mast assembly 130. Moreover, the winch assembly 134 selectively applies a second tension “T2” on the movable mast section 132 when the movable mast section 132 is locked with the fixed mast section 130 to prevent relative movement between the fixed mast section 130 and the movable mast section 132. The second tension “T2” is hereinafter interchangeably referred to as the tension “T2”.

Further, the winch assembly 134 includes the cable 136 that selectively applies the tension “T2” by the winch assembly 134. More particularly, the cable 136 is adapted to selectively apply the tension “T2” on the movable mast section 132 to prevent relative movement between the fixed mast section 130 and the movable mast section 132. Further, the cable 136 is adapted to selectively allow relative movement between the fixed mast section 130 and the movable mast section 132. More particularly, the cable 136 selectively applies the first tension “T1” to move the movable mast section 132 relative to the fixed mast section 130. The winch assembly 134 includes a first pulley (not shown) coupled with the fixed mast section 130 by a bracket 138, a second pulley 140, and a winch drum 150. The cable 136 is routed through the first pulley and the second pulley 140 such that one end of the cable 136 is terminated at an upper end 146 of the fixed mast section 130. The winch assembly 134 may be operated manually or using a power drill (not shown).

Further, the winch assembly 134 includes a handle 148. When the winch assembly 134 is manually operated, a personnel rotates the handle 148 which in turn rotates the winch drum 150 through a series of gears (not shown). The rotation of the winch drum 150 causes the cable 136 to retract or wind around the winch drum 150. The retraction of the cable 136 around the winch drum 150 causes the movable mast section 132 to move along the first direction "D1" (shown in FIG. 2) thereby raising the height "H1" of the mast assembly 128. Further, the winch assembly 134 applies the tension "T2" on the movable mast section 132 to retain the movable mast section 132 in a stationary position. More particularly, the winch assembly 134 locks the movable mast section 132 with the fixed mast section 130 in order to eliminate any relative movement between the fixed mast section 130 and the movable mast section 132. In an example, the winch assembly 134 may include a brake mechanism (not shown) that restricts any further winding of the cable 136 around the winch drum 150 thereby restricting any relative movement between the movable mast section 132 and the fixed mast section 130. It should be noted that the movable mast section 132 is held in the stationary position based on the second tension "T2" applied by the winch assembly 134. Further, an unwinding of the cable 136 causes the movable mast section 132 to move in the direction that is opposite to the first direction "D1" thereby reducing the height "H1" of the mast assembly 128.

When the winch assembly 134 is operated by the power drill, the handle 148 is replaced by a clutch adapter. The clutch adapter is coupled to a powered drive hub of the winch assembly 134. The power drill is then attached to an input shaft of the clutch adapter. When the power drill is activated, the input shaft is rotated which rotates the winch drum 150 through the series of gears and the cable 136 is retracted around the winch drum 150 thereby raising the height "H1" of the mast assembly 128.

As shown in FIG. 2, the fall protection system 100 also includes a jib 152 inclined with respect to the mast assembly 128 and pivotably connected to the mast assembly 128. More particularly, the jib 152 is pivotably connected to the movable mast section 132. In the illustrated embodiment, the jib 152 is substantially perpendicular to the movable mast section 132. The jib 152 defines a first end 158 and a second end 159. A first bracket member 154 is fixedly connected at an upper portion 156 of the movable mast section 132. The first end 158 of the jib 152 is connected to the first bracket member 154 such that the jib 152 is pivotably connected at a pivot point 160. The first bracket member 154 may include bearings and a shaft that facilitates pivoting of the jib 152 relative to the movable mast section 132. In some examples, the jib 152 may include one or more telescopic arms, without any limitations. Further, when the fall protection system 100 is assembled, the jib 152 is held perpendicular to the mast assembly 128 by a bar 162. A first end 164 of the bar 162 is pivotably connected to the movable mast section 132 by a second bracket member 166. A second end 168 of the bar 162 is connected to the jib 152 by a third bracket member 170.

In an example, the jib 152 includes an anchor point 172. As illustrated in FIG. 2, the anchor point 172 is connected to the second end 159 of the jib 152. The anchor point 172 provides a point at which one end of a securing device, such as a cable, a harness, or any other such device may be secured to the fall protection system 100. Another end of the securing device is secured to the personnel to provide fall protection to the personnel. In other examples, a location of the anchor point 172 may vary, as per requirements. For example, the jib 152 may include a track (not shown) secured to an underside of the jib 152. A trolley (not shown) may be slidably or rollably connected to the track such that the anchor point 172 is connected to the trolley in order to vary the location of the anchor point 172.

Figure 4:
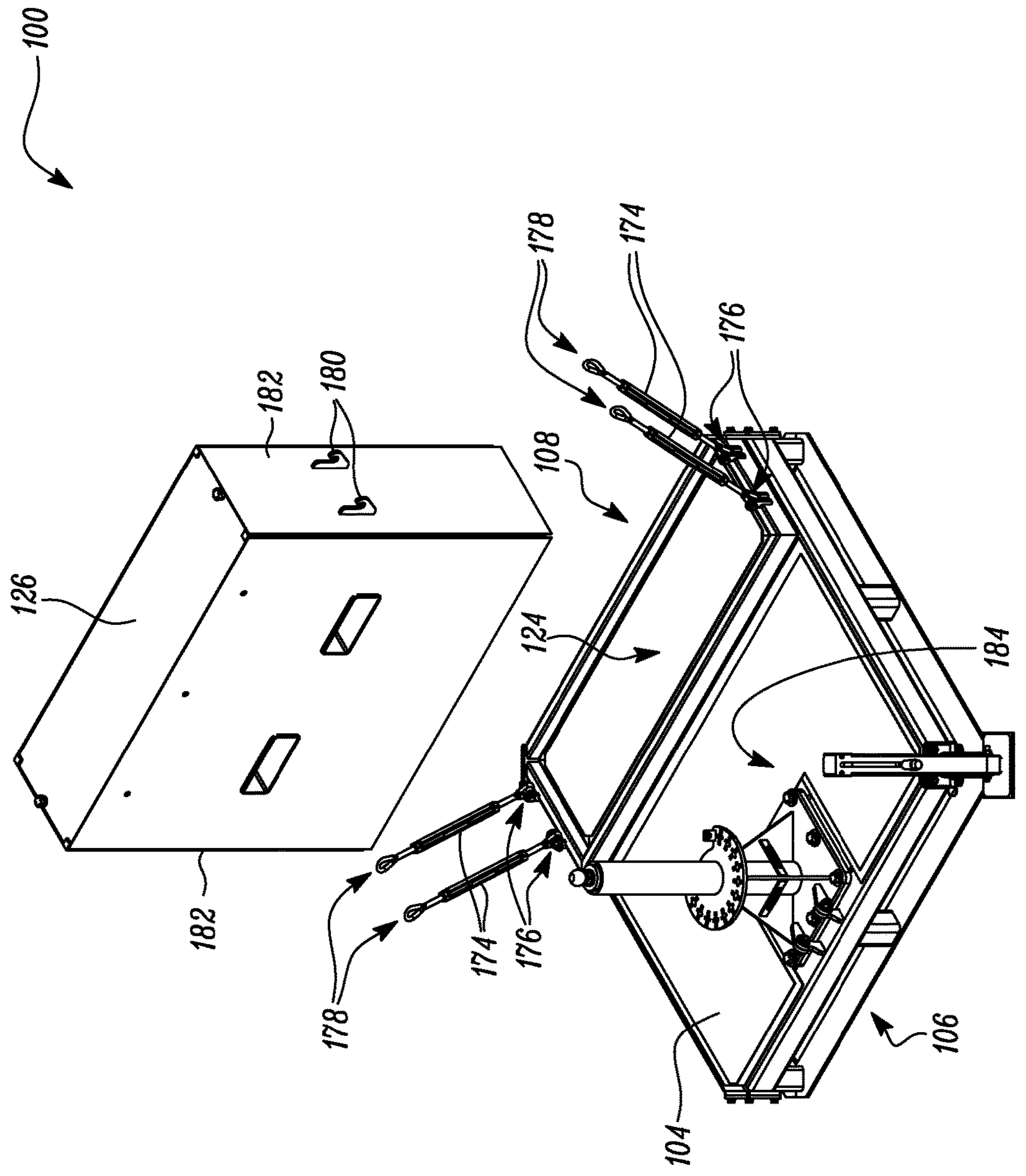
FIG. 4 is an exploded view of the fall protection system illustrating a counterweight and a base plate of the fall protection system shown in FIG. 1.

Referring to FIG. 4, the fall protection system 100 includes the counterweight 126 connectable to the base plate 104 proximate to the second side 108 of the base plate 104. In the illustrated embodiment, the counterweight 126 is generally cuboidal in shape. However, a shape of the counterweight 126 may vary as per application requirements. The counterweight 126 is receivable within a slot 124 of the base plate 104. The base plate 104 defines the slot 124 at the second side 108. The slot 124 at least partially receives the counterweight 126 therein. A shape and size of the slot 124 is based on a shape and size of the counterweight 126. Further, a material of the counterweight 126 includes at least one of metal and concrete. As such, the counterweight 126 may embody a cast block of a metal or its alloys. Alternatively, the counterweight 126 may embody a cast block of concrete. In some cases, the counterweight 126 may detachably receive multiple weights. The number and type of the weights may be changed as per applications requirements.

The counterweight 126 is removably connected to the base plate 104. Accordingly, the fall protection system 100 includes a plurality of fastening elements 174 for removably connecting the counterweight 126 to the base plate 104. The fall protection system 100 includes four fastening elements 174. However, a total number of the fastening elements 174 may vary as per requirements. Accordingly, the fall protection system 100 may include two fastening elements 174 for removably connecting the counterweight 126 to the base plate 104. A first end 176 of each of the fastening elements 174 is connected to the base plate 104 whereas a second end 178 of each of the fastening elements 174 is connected to the counterweight 126. The counterweight 126 includes hooks 180 that removably receive the second end 178 of the fastening elements 174 for connecting the counterweight 126 to the base plate 104. The counterweight 126 illustrated herein include four hooks 180 arranged on side surfaces 182 of the counterweight 126. It should be noted that when the fall protection system 100 includes two fastening elements 174, the counterweight 126 may include two hooks 180 arranged on the side surfaces 182 of the counterweight 126. More particularly, each of the side surfaces 182 may include a single hook 180 to removably receive the second end 178 of the corresponding fastening elements 174.

The plurality of fastening elements 174 includes at least one of a plurality of cables and a plurality of turnbuckles. In the illustrated embodiment, the fastening elements 174 are embodied as turnbuckles. As the counterweight 126 is removably connected to the base plate 104, the counterweight 126 may be removed during transportation of the conveying apparatus 102. The removal of the counterweight 126 may allow the fall protection system 100 to be transported by the conveying apparatus 102 of a smaller capacity by moving the counterweight 126 and the fall protection system 100 separately.

Figure 5:
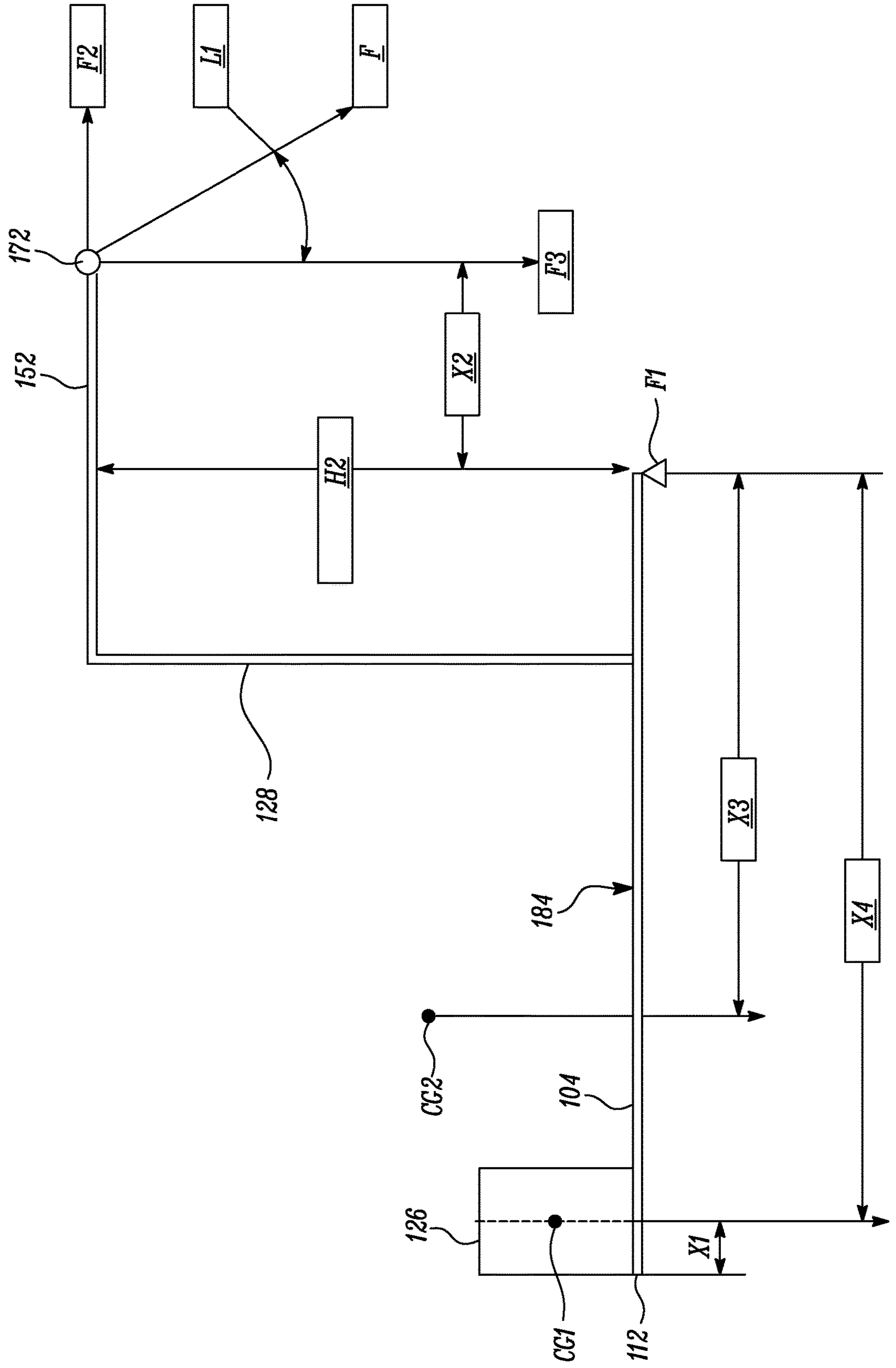
FIG. 5 is a schematic view illustrating various parameters associated with the fall protection system shown in FIG. 1.

Referring to FIGS. 4 and 5, a center of gravity "CG1" of the counterweight 126 is offset from a center 184 of the base plate 104. More particularly, the center of gravity "CG1" of the counterweight 126 is defined at a distance "X1" (shown in FIG. 5) from the second surface 112 (see FIG. 5) of the base plate 104. In an example, the distance "X1" approximately lies in a range of 1 feet and 2 feet, without any limitations. In specific examples, the center of gravity "CG1" of the counterweight 126 lies within 2 feet (60.96 centimeters) from a front most portion of the conveying apparatus 102 (see FIG. 1) that is used for transporting the fall protection system 100. As the center of gravity "CG1" lies within 2 feet from the conveying apparatus 102, the fall protection system 100 may be picked up and moved by the conveying apparatus 102 of a smaller capacity. More particularly, connecting the counterweight 126 at the second side 108 of the base plate 104 such that the center of gravity "CG1" of the counterweight 126 lies at the distance "X1" from the second surface 112 may shift the center of gravity "CG1" away from a tipping point which may in turn allow a weight of the fall protection system 100 to be reduced while maintaining an overall size of the base plate 104.

As illustrated in FIG. 5, in an example, a static equilibrium equation may be used to determine the weight of counterweight 126 that is required to support a force "F". The force "F" may include a horizontal component of force "F2" and/or a vertical component of force "F3" that may be exerted on the fall protection system 100. The static equilibrium equation may use variables such as a cantilevered distance "X2", an anchor height "H2", the weight of the fall protection system 100, a center of gravity "CG2" of the fall protection system 100, the weight of the counterweight 126, the center of gravity "CG1" of the counterweight 126, a distance "X3" between a fulcrum "F1" and the center of gravity "CG2" of the fall protection system 100, a distance "X4" between the fulcrum "F1" and the center of gravity "CG1" of the counterweight 126, an angle of loading "L1", and the force "F" exerted on the fall protection system 100 at the anchor point 172.

The location of the center of gravity "CG1" of the counterweight 126 at the distance "X1" from the second surface 112 may effectively counter the force "F". This may allow reduction in the weight of the fall protection system 100, as the weight of the fall protection system 100 is dependent on the center of gravity "CG1". Accordingly, the reduction in the weight of the fall protection system 100 may allow reduction in the weight of the counterweight 126. Additionally, the reduction in the weight of the fall protection system 100 may improve the transportability of the fall protection system 100 as it can be moved using conveying apparatuses of a smaller capacity. Thus, customers of the fall protection system 100 may use conveying apparatuses that are readily available.

It should be noted that the present disclosure may provide a technique to reduce the weight of the fall protection system 100 and allow relocation of the center of gravity "CG1" of the counterweight 126 away from the fulcrum "F1" while maintaining a reasonably small footprint area of the base plate 104. Such a technique may allow reduction in the weight of the counterweight 126 which may in turn allow the fall protection system 100 to be transported by smaller conveying apparatuses and may also allow further extension of the cantilevered distance "X2". Further, the fall protection system 100 described herein may be easy to assemble and transport.

Figure 6:
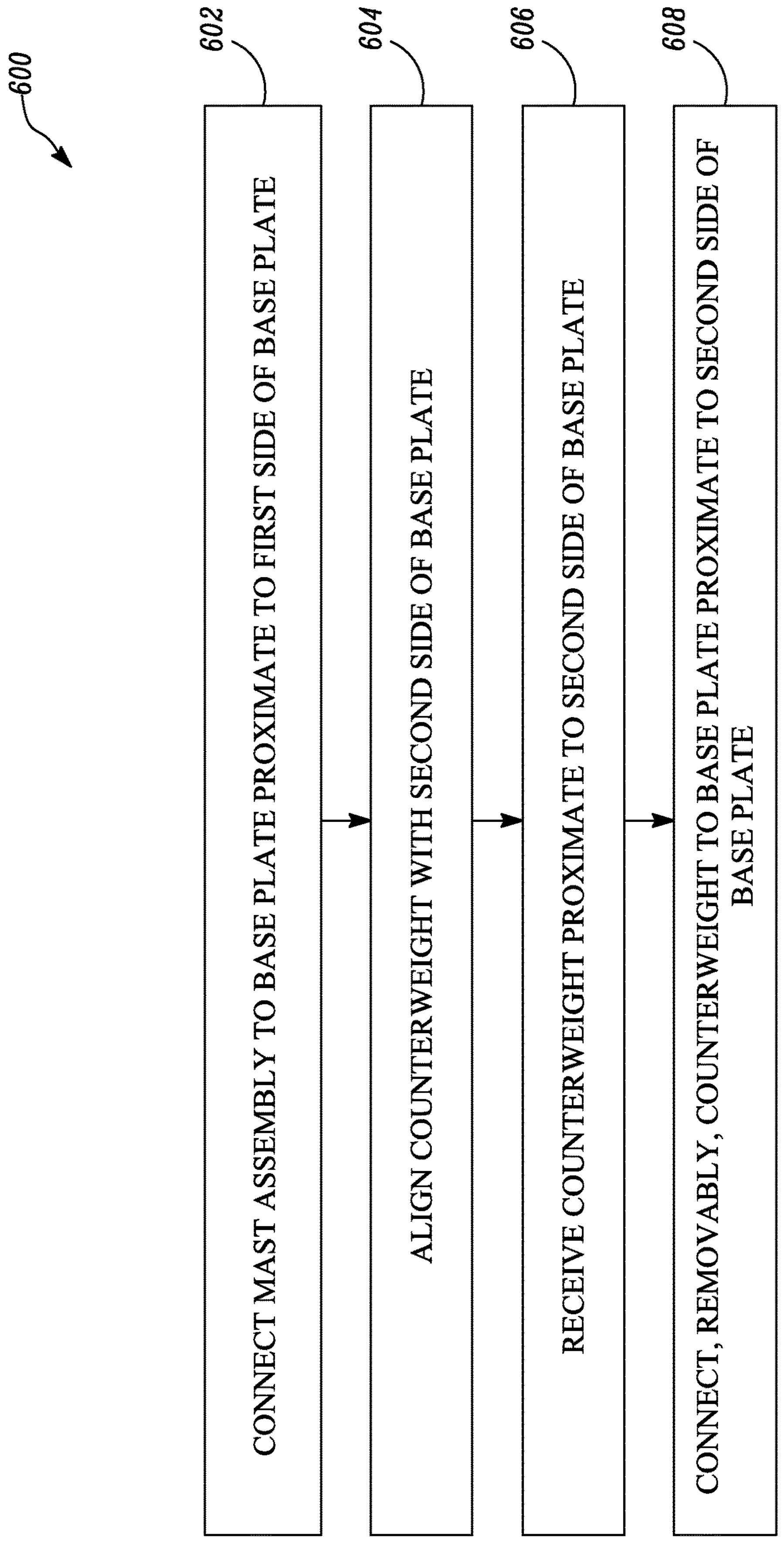
FIG. 6 is a flowchart for a method of assembling the fall protection system shown in FIG. 1.

FIG. 6 illustrates a method 600 of assembling the fall protection system 100. The fall protection system 100 includes the base plate 104 defining the first side 106 and the second side 108 defined opposite to the first side 106. Further, the base plate 104 of the fall protection system 100 is received by the conveying apparatus 102. At step 602, the mast assembly 128 is connected to the base plate 104 proximate to the first side 106 of the base plate 104. At step 604, the counterweight 126 is aligned with the second side 108 of the base plate 104. At step 606, the counterweight 126 is received proximate to the second side 108 of the base plate 104.

At step 608, the counterweight 126 is removably connected to the base plate 104 proximate to the second side 108 of the base plate 104. The counterweight 126 is removably connected to the base plate 104 by the plurality of fastening elements 174. The plurality of fastening elements 174 includes at least one of the plurality of cables and the plurality of turnbuckles. Further, the counterweight 126 is received within the slot 124 defined at the second side 108 of the base plate 104. Moreover, the counterweight 126 is connected to the base plate 104 such that the center of gravity "CG1" of the counterweight 126 is offset from the center 184 of the base plate 104.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A fall protection system comprising:
- a base plate defining a first side and a second side defined opposite to the first side, the base plate comprising one or more ports configured so that the base plate is receivable by a conveying apparatus;
- a mast assembly rotatably connected to the base plate proximate to the first side of the base plate so that the mast assembly is rotatable relative to the base plate and to a counterweight connected thereto, about an axis of rotation that is aligned with a long axis of the mast assembly;
- a jib inclined with respect to the mast assembly and pivotably connected to the mast assembly; and
- a counterweight connectable to the base plate proximate to the second side of the base plate, wherein a center of gravity of the counterweight is offset from a center of the base plate.

2. The fall protection system of claim 1, wherein the base plate further defines a slot at the second side, wherein the slot at least partially receives the counterweight therein.

3. The fall protection system of claim 1, wherein the counterweight is generally rectangular in shape.

4. The fall protection system of claim 1 further comprising a plurality of fastening elements for removably connecting the counterweight to the base plate.

5. The fall protection system of claim 4, wherein the plurality of fastening elements includes at least one of a plurality of cables and a plurality of turnbuckles.

6. The fall protection system of claim 1, wherein a material of the counterweight includes at least one of metal and concrete.

7. The fall protection system of claim 1 wherein the mast assembly is rotatably connected to the base plate by way of a lower end of the mast assembly being connected to a base assembly that is pivotably connected to the base plate so that the base assembly and the mast assembly can be pivoted about a pivot axis that is perpendicular to the long axis of the mast assembly.

8. The fall protection system of claim 7 wherein the base assembly is pivotably connected to the base plate by way of a plate of the base assembly being removably coupled to the base plate by one more mechanical fasteners.

9. The fall protection system of claim 8 wherein the base assembly is configured so that the one or more mechanical fasteners that removably couple the plate of the base assembly to the base plate, are removable to facilitate pivoting of the base assembly, and the mast assembly, about the pivot axis.

10. The fall protection system of claim 1 wherein the counterweight is connected to the base plate.

11. The fall protection system of claim 10 wherein the counterweight is removably connected to the base plate.

12. The fall protection system of claim 1 wherein the center of gravity of the counterweight is at a distance (X1) from a second surface of the second side of the base plate, said distance lying in a range of 30.48 and 60.96 cm (1 foot and 2 feet).

13. The fall protection system of claim 1 wherein the mast assembly comprises a fixed mast section and a movable mast section adapted to move relative to the fixed mast section to adjust a height of the mast assembly.

14. The fall protection system of claim 13 wherein the fall protection system comprises a winch assembly that is operably connected to the movable mast section and that is adapted to move the movable mast section relative to the fixed mast section.

15. The fall protection system of claim 14 wherein the winch assembly is operably connected to the movable mast section by a bracket and wherein the winch assembly comprises a cable whose proximal end is connected to a winch drum of the winch assembly and whose distal end is connected to an upper end of the fixed mast section.

16. A method of assembling the fall protection system of claim 1, the method comprising:

connecting the mast assembly to the base plate proximate to the first side of the base plate;

aligning the counterweight with the second side of the base plate;

receiving the counterweight proximate to the second side of the base plate; and connecting, removably, the counterweight to the base plate proximate to the second side of the base plate.

17. The method of claim 16 further comprising receiving the counterweight within a slot defined at the second side of the base plate.

18. The method of claim 16 further comprising removably connecting the counterweight to the base plate by a plurality of fastening elements.

19. The method of claim 18, wherein the plurality of fastening elements includes at least one of a plurality of cables and a plurality of turnbuckles.

20. The method of claim 16 further comprising receiving the base plate of the fall protection system by the conveying apparatus.

* * * * *